Patented July 20, 1954

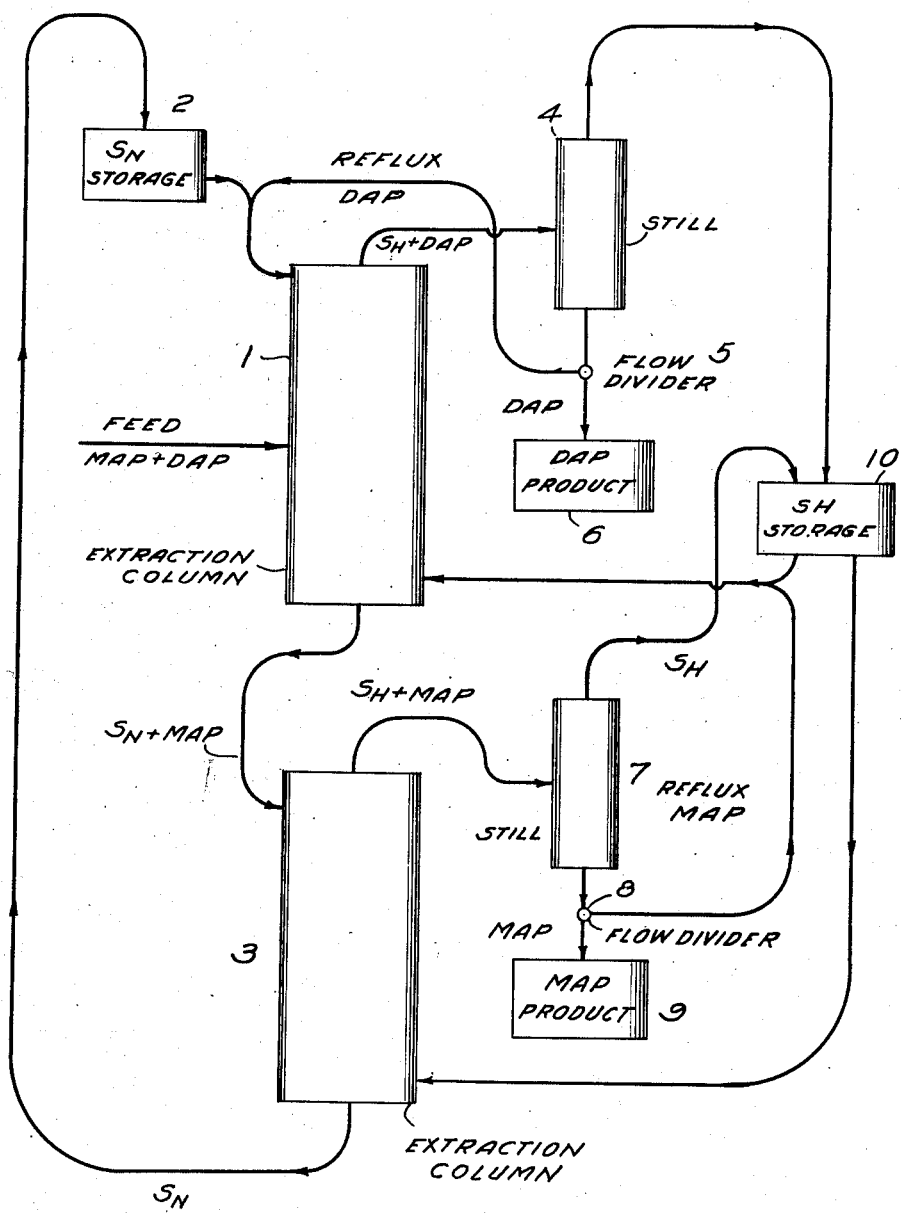

2,684,388

UNITED STATES PATENT OFFICE 2,684,388

SEPARATION OF ALKYLATED PHENOLS BY SOLVENT EXTRACTION

Frank A. V. Sullivan, Glenbrook, and Kenneth W. Saunders, Darien, Conn., assignors to American Cyanamid Company, New York, N. Y., a corporation of Maine Application April 6, 1950, Serial No. 154,368

16 Claims. (Cl. 260—624)

This invention relates to the separation of phenols having different carbon to hydrogen ratios by selective extraction processes.

The separation of various phenols such as mixtures of different substituted phenols presents in many cases a serious problem. Often the volatility characteristics of the different compounds are not suitable for separation by distillation. The most serious problem of commercial significance is the separation of tertiarybutyl phenols, such as separating monotertiarybutyl-p-cresol from ditertiarybutyl-p-cresol. This problem has hitherto resisted economical solution.

According to the present invention, it has been found that dinitrile solvents having the following formula:

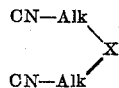

in which Alk is alkyl and X is oxygen, sulfur, NH, or N-alkyl, have very sharp solvent differences for phenols having a different carbon to hydrogen ratio. These solvents strongly favor the solution of phenols of high carbon to hydrogen ratio. It should be understood that the solubility is also affected by other characteristics of the phenols, and differentiation is most effective between phenols of similar chemical constitution. For example, there is a great difference in solubility of mono- and ditertiarylbutyl-p-cresols, with a comparatively small difference in carbon to hydrogen ratio. A much greater difference in carbon to hydrogen ratio in the case of such compounds as dodecylphenol do not show a proportionately greater solvent difference. The fact that other factors also influence solubility is of no practical significance because, when mixtures are produced which present a practical separation problem, they are always mixtures of fairly closely related chemical compounds.

It is possible to use the dinitrile solvents alone as extractants. Sometimes the solubility differences are improved by mixing some water with the solvent and extracting it at higher temperatures. This modification permits operating with a minimum of equipment and presents no serious operating problems. Solvent recovery can be effected by the cheap processes described and claimed in the copending applications of Medcalf and Sisco, Serial Nos. 143,585 and 143,586, filed February 10, 1950, now Patents No. 2,568,159 and 2,568,160, respectively, and of Vriens, Sisco and Medcalf, Serial No. 143,584, filed February 10, 1950, now Patent No. 2,568,176. The first process involves removing the solvent with hot water, in which all of the dinitriles are quite soluble, and then cooling to separate the two liquids. This process, which is economical and requires only low-cost equipment, can be used with practically all of the dinitrile solvents except bis (2-cyanoethyl) amine, which is miscible in all proportions in water at room temperature. Excellent recoveries are possible with one of the best and cheapest solvents, bis(2-cyanoethyl)-ether. The process of the Vriens, Sisco and Medcalf application involves extracting the solvent by means of a paraffin hydrocarbon, such as n-heptane, and commercial paraffin fractions containing saturated hydrocarbons of an average of about seven carbon atoms. The dinitrile solvents show extraordinarily low solubility in paraffins at room temperature, and this process, though requiring somewhat more equipment, can be used with all of the dinitriles.

Another method of using the dinitrile solvents is by partition, in which case a mixture of dinitrile solvent and a saturated hydrocarbon, such as a paraffin or a cycloparaffin, is used in counter-current extraction. By this method in some cases sharper separation is possible than with a dinitrile solvent alone, and where improved sharpness of separation is obtained, this modification is preferred. Both modifications give practical separations, and the choice will be dictated by economic considerations and purity requirements. It is an advantage of the invention that it is very flexible, and the best modification for each particular problem can be chosen without requiring compromise.

When the two-solvent counter-current modification is used, extraction columns or similar vessels are normally desirable so that the processes can be made continuous. In such cases, the extraction requirements will usually be calculated in terms of theoretical plates; although, frequently, a plate column is less suitable than other types of vessels. As in all extraction processes, the degree of separation is a product of two factors: the plate equivalent of the column, and the amount of recycling of the two solvents which, in analogy to distillation proceedings, is ordinarily referred to as "reflux." The actual column is usually chosen larger than that corresponding to the theoretical plate requirement because the latter presupposes infinite reflux. As in all good chemical engineering practice, a compromise is chosen between equipment cost and operating capacity. As a rough rule of thumb it is common to design equipment having a plate equivalent double that of the theoretical, and this method of calculation will be followed in the present description wherever separating vessel characteristics are referred to.

The three cheapest dinitrile solvents available under present day condition are the bis(2-cyanoethyl) ether, amine and sulfide. The first two show some advantage in solvent powers for many separations, though the sulfide is so near as to be practically useful. The choice between bis(2-cyanoethyl) ether and bis(2-cyanoethyl)-amine will be dictated by price and by the operating conditions. Bis(2-cyanoethyl) ether permits solvent recovery with water, and where the solvent characteristics of the two are substantially the same the ether will usually be preferred. In addition to the three simple dinitrile compounds, others can be used, such as dicyanodimethyl ether, $\alpha,\beta'$-dicyanodiethyl ether, various isomeric dicyanodipropyl ethers, mixed ethers, such as cyanoethylcyanomethyl ether and the like. Other amines are bis(cyanomethyl) N-methyl amine, $\alpha,\beta'$-dicyanodiethyl amine, dicyanodimethylamines, various isomeric dicyano dipropyl amines, and the like.

Where the second modification, using a combination of dinitrile solvent and hydrocarbon solvent is employed, there can be used as a second solvent any saturated hydrocarbon liquid such as n-heptane, dodecane, aliphatic naphthas which are mixtures of paraffins having from six to eight carbon atoms, cycloparaffins such as cyclohexane, methylcyclohexane and the like. The choice of saturated hydrocarbon liquid is largely governed by its boiling point, because in many cases a saturated hydrocarbon may be chosen which boils at a temperature so far removed from the boiling point of the phenol, which is extracted, that cheap and simple separation by distillation can be effected. There is, naturally, a certain small difference in relative solubilities of the phenols having higher hydrogen to carbon ratio in the different saturated hydrocarbons; however, this solubility difference is usually not so great as to dictate the choice of hydrocarbon to use, the other factors such as its boiling point usually being decisive.

Reference has been made above to single dinitrile solvents and in most operations the use of a single dinitrile solvent will be chosen. It should be understood, however, that a mixture of dinitrile solvents may be employed in either modification where its cost or solvent characteristics render it desirable. Throughout the rest of the present specification the process will be described in terms of single dinitrile solvents, it being understood that the invention is not limited thereto but includes mixtures as well.

The process will be described in greater detail in conjunction with the specific examples and with the drawing, which is a diagrammatic flowsheet of a process using dinitrile and hydrocarbon solvents with hydrocarbon solvent recovery of the dinitrile solvents.

*Example 1*

A mixture of 41% of monotertiarybutyl-p-cresol and 59% of ditertiarybutyl-p-cresol was treated with an approximately equal weight of a 75% aqueous solution of bis(2-cyanoethyl) amine. On agitation at 25° C. a crystalline solid separated, was washed with water and dried. It analyzed 96% by weight ditertiarybutyl-p-cresol and 4% by weight monotertiarybutyl-p-cresol.

*Example 2*

The procedure of Example 1 was followed at 75° C. Two liquid layers formed which were separated and cooled. On cooling, a solid crystalline material separated from the lighter phase and on analysis by infrared had a composition of 95.4% ditertiarybutyl-p-cresol and 2.7% monotertiarybutyl-p-cresol.

*Example 3*

The procedure of Example 2 was followed at 95° C. Again, two layers formed which were separated and, on cooling, a crystalline solid precipitated out of the upper phase which, on infrared analysis, showed 92.2% ditertiarylbutyl-p-cresol and 8.1% monotertiarybutyl-p-cresol.

*Example 4*

The procedure of Example 1 was repeated, permitting the mixture to stand for fifteen hours. The crystalline precipitate which formed, after washing and drying, analyzed 98.2% ditertiarybutyl - p - cresol by infrared and 1.3% monotertiarybutyl-p-cresol.

*Example 5*

100 parts of the mixture of cresols described in Example 1 was treated with an aqueous solution containing 40 parts of bis(2-cyanoethyl) ether and 13 parts of water. On stirring for fifteen hours at room temperature, crystalline material precipitated which, by infrared analysis, was shown to contain 93.2% ditertiarylbutyl-p-cresol and 2.7% monotertiarybutyl-p-cresol.

*Example 6*

A mixture of 47 parts by weight of monotertiarybutyl-p-cresol and 53 parts of ditertiarybutyl-p-cresol was extracted at room temperature with 100 parts of bis(2-cyanoethyl) amine. The crystalline solids were separated, washed and dried, and the mother liquid extracted with heptane. The analyses by infrared were as follows:

| Starting Material | Bis (2-cyanoethyl) Amine Solution | | Heptane Extraction | |
|---|---|---|---|---|
| | Solids | Solution | Heptane Solution | Bis (2-cyanoethyl) Amine Soln. |
| (1) 47 parts | 0.6 | 46.4 | 9.5 | 36.9 |
| (2) 53 parts | 34.4 | 18.6 | 13.8 | 4.8 |

(1) = monotertiarybutyl-p-cresol.
(2) = ditertiarybutyl-p-cresol.

*Example 7*

An equimolecular mixture of mono- and ditertiarybutyl-p-cresols were partitioned between bis(2-cyanoethyl) ether and heptane. The extraction, which was at room temperature, was carried out in accordance with the flowsheet on the drawing, on which the monoalkyl phenol is abbreviated MAP and the dialkyl phenol DAP. The dinitrile solvent is abbreviated $S_N$ and the heptane, or hydrocarbon solvent, $S_H$.

The extraction column 1, of 4 theoretical plates' capacity, receives a feed of the two cresols. The dinitrile solvent, bis(2-cyanoethyl) ether, flows into the top of the column from storage tank 2; and the heptane into the bottom of the column from storage tank 10. As a result of the difference in distribution coefficients, the two cresols partitioned themselves between the solvents, the heptane leaving the top being richer in the ditertiarybutyl-p-cresol, and the dinitrile solvent leaving the bottom of the column being richer in the monotertiarybutyl-p-cresol. The former flows to a still 4 where the heptane is boiled off, and the latter to a secondary extraction column 3. The ditertiarybutyl-p-cresol, containing some monotertiarybutyl-p-cresol, is divided by the flow-divider 5, some flowing to the product tank 6 and the rest being recycled, or refluxed, to the top of the extraction column 1. After equilibrium, a ditertiarybutyl-p-cresol is obtained having a very high melting point, 69–71° C., and therefore is at high purity.

The solution of monotertiarybutyl-p-cresol is extracted in column 3 by a counter-current flow of heptane as indicated on the drawing. Again, the heptane solution passes to a still 7 where the heptane is distilled and returned to the storage tank 10, the conventional condensers being omitted from the flowsheet. The residue, which is a mixture of monotertiarybutyl-p-cresol with some dinitrile solvent, is divided by the flow-divider 8, a portion being refluxed to the bottom of extraction column 1 and another portion passing to the product storage tank 9. The dinitrile solvent leaving the bottom of column 3, containing dissolved in it a small amount of monotertiarybutyl-p-cresol, is returned to the storage tank 2 whence it eventually passes again through the column 1. The flow-divider 8 is adjusted to give sufficient reflux so that a monotertiarybutyl-p-cresol of satisfactory purity is obtained in the tank 9 after the system has come to equilibrium.

As in all counter-current extraction processes involving reflux, when starting up the flow-dividers 5 and 8 are set for 100% reflux until equilibrium is reached before a portion is passed to the product tanks 6 and 9.

*Example 8*

The procedure of Example 7 was repeated using a mixture of p-cresol and dodecyl phenol. A sharp separation is obtained, the p-cresol being recovered in tank 9 and the dodecyl phenol in tank 6.

*Example 9*

The procedure of Example 8 was followed using bis(2-cyanoethyl) sulfide as $S_N$ and VMP naphtha as $S_H$. A satisfactory separation was obtained. The solubility of the cresol in the bis(2-cyanoethyl) sulfide differs somewhat from that in the bis(2-cyanoethyl) ether and a somewhat lower reflux ratio can be used.

In the preceding examples heptane and paraffins of comparable molecular weight are used as the hydrocarbon solvent. For most processes these low-boiling hydrocarbons are preferred because they are cheap and effective. However, the invention is not limited thereto and other saturated hydrocarbons such as cyclohexane and methylcyclohexane may be used. In the case of alkyl phenols of very low boiling point it is also possible to use high-boiling paraffins. In this case it is possible to distill the low-boiling phenol away from the paraffin solvent which, of course, results in reversing the stills 4 and 7.

We claim:

1. A process for separating alkylated phenols of different degrees of alkylation, which comprises subjecting a mixture of the phenols to extraction with a solvent comprising a dinitrile of the following formula:

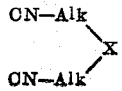

in which Alk is alkyl, and X is oxygen, sulfur, NH or N-alkyl.

2. A process according to claim 1 in which the phenols are a mixture of mono- and ditertiarybutyl-p-cresols.

3. A process according to claim 2 in which the solvent is a concentrated solution of bis(2-cyanoethyl)amine in water.

4. A process according to claim 2 in which the solvent is a concentrated bis(2-cyanoethyl)-ether.

5. A process according to claim 1 in which X is NH.

6. A process according to claim 1 in which X is oxygen.

7. A process according to claim 1 in which X is sulfur.

8. A process according to claim 1 in which the solvent is a mixture of the dinitrile solvent of claim 1 and a saturated hydrocarbon.

9. A process according to claim 8 in which the dinitrile solvent is bis(2-cyanoethyl) ether.

10. A process according to claim 9 in which the phenols are a mixture of mono- and ditertiarybutyl-p-cresol.

11. A process of separating mixtures of alkylated phenols into fractions having different solubilities, which comprises subjecting the mixture of alkylated phenols to extraction with a mixture of immiscible organic solvents, one of said immiscible solvents being a dinitrile solvent having the following formula

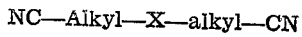

X is selected from the group consisting of oxygen, sulfur, NH and N-alkyl, and the other immiscible solvent is a saturated hydrocarbon solvent immiscible with said dinitrile solvent, separating the two immiscible solvent layers so formed, recovering the alkylated phenols dissolved in the hydrocarbon solvent layer and separately recovering the alkylated phenols dissolved in the dinitrile solvent layer.

12. The process of claim 11 wherein the hydrocarbon solvent is heptane.

13. The process of claim 11 wherein said dinitrile solvent is bis(2-cyanoethyl) ether.

14. The process of claim 11 wherein said mixture of alkylated phenols comprises ditertiarybutyl-p-cresol and monotertiarybutyl-p-cresol.

15. A process of resolving a mixture of alkylated phenols comprising ditertiarybutyl-p-cresol and monotertiarybutyl-p-cresol which comprises subjecting said mixture of alkylated phenols to liquid-liquid extraction with two solvents which are immiscible with one another, one of said immiscible solvents being bis(2-cyanoethyl) ether and the other immiscible solvent being a low boiling saturated hydrocarbon and thereby effecting preferential dissolution of ditertiarybutyl-p-cresol in the said hydrocarbon solvent and preferential dissolution of the monotertiarybutyl-p-cresol in said dinitrile ether solvent.

16. A process of claim 15 wherein the low boiling saturated hydrocarbon solvent is heptane.

References Cited in the file of this patent

UNITED STATES PATENTS

| Number | Name | Date |
| --- | --- | --- |
| 2,288,281 | Huijser et al. | June 30, 1942 |
| 2,433,751 | Friedman | Dec. 30, 1947 |
| 2,439,534 | Wilkes, Jr. | Apr. 13, 1948 |
| 2,441,827 | McKinnis | May 18, 1948 |
| 2,568,176 | Vriens et al. | Sept. 18, 1951 |